United States Patent
Eberl (10) Patent No.: US 10,142,867 B2
(45) Date of Patent: Nov. 27, 2018

(54) MOBILE COMMUNICATION DEVICE AND METHOD

(71) Applicant: Rohde & Schwarz GmbH & Co. KG, München (DE)

(72) Inventor: Peter Eberl, Arget (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/581,746

(22) Filed: Apr. 28, 2017

(65) Prior Publication Data

US 2018/0317105 A1    Nov. 1, 2018

(51) Int. Cl.
| | |
|---|---|
| *H04B 17/00* | (2015.01) |
| *H04W 24/06* | (2009.01) |
| *H04B 17/309* | (2015.01) |
| *H04B 1/403* | (2015.01) |

(52) U.S. Cl.
CPC .......... *H04W 24/06* (2013.01); *H04B 1/406* (2013.01); *H04B 17/309* (2015.01)

(58) Field of Classification Search
CPC ...... H04W 24/06; H04B 1/406; H04B 17/309

USPC .................................................... 455/67.14
See application file for complete search history.

(56) References Cited

U.S. PATENT DOCUMENTS

| | | | |
|---|---|---|---|
| 6,236,363 B1 | 5/2001 | Robbins et al. | |
| 2008/0280566 A1 | 11/2008 | Yen et al. | |
| 2016/0373196 A1* | 12/2016 | Stott | H04B 17/336 |

OTHER PUBLICATIONS

Fontaine et al., "A Multipath Channel Emulator Integrated with a QAM Modulator," 26th IEEE Canadian Conference of Electrical and Computer Engineering (CCECE), Jul. 25, 2013, 4 pp.
Extended Search Report from counterpart European Application No. 17203744, dated Jun. 7, 2018, 8 pp.

\* cited by examiner

*Primary Examiner* — Eugene Yun
(74) *Attorney, Agent, or Firm* — Shumaker & Sieffert, P.A.

(57) ABSTRACT

A mobile communication device comprises a communication interface for wireless communication of the mobile communication device with wireless devices over a wireless communication channel, and a channel simulation unit for simulating modified channel properties of the wireless communication channel.

24 Claims, 5 Drawing Sheets

MOBILE COMMUNICATION DEVICE AND METHOD

TECHNICAL FIELD

The present invention relates to a mobile communication device. The present invention further relates to a method for operating a mobile communication device.

BACKGROUND

Although applicable in principal to any communication system, the present invention and its underlying problem will be hereinafter described in combination with wireless mobile devices.

Modern communication systems increasingly use wireless communication between the single devices. During development, production or in the field of devices for such communication systems it is necessary to thoroughly test the wireless communication capabilities of the devices for compliance with communication standards and legal regulations and analyze different configurations of the wireless devices in the field.

Complex and costly test equipment is required to perform such tests. Further, the preparations for performing such tests are time consuming and the test arrangements offer little flexibility.

Against this background, the problem addressed by the present invention is allowing simplified testing of mobile devices.

SUMMARY

The present invention solves this objective by a mobile communication device with the features of claim 1 and a method with the features of claim 15.

Accordingly it is provided:

A mobile communication device comprising a communication interface for wireless communication of the mobile communication device with wireless devices, like e.g. base stations or other mobile communication devices, over a wireless communication channel, and a channel simulation unit for simulating modified channel properties of the wireless communication channel.

Further, it is provided:

A method for operating a mobile communication device, the method comprising wirelessly communicating the mobile communication device with wireless devices over a wireless communication channel, and simulating in the mobile communication device modified channel properties of the wireless communication channel.

The mobile communication device may e.g. be a smartphone or an internet-of-things wireless device or any other wireless device that communicates via the wireless communication channel. The wireless communication channel may comprise e.g. a specific frequency range in a frequency band that is specified for the communication system that the mobile communication device uses. Usually the communication channels, i.e. the respective frequency ranges, will be specified e.g. by a respective communication standard. The actual wireless communication channel that the mobile communication device uses for communication may e.g. be determined by a base station to which the communication device is connected.

The communication interface may also be called the modem of the mobile communication device and manage the communication of the mobile communication device via the wireless communication channel. The communication interface therefore serves to convert e.g. digital voice or data signals into waveforms, i.e. analog signals, that may transmit the digital voice or data signals via the wireless communication channel. Further, the communication interface will convert received waveforms or analog signals into digital voice or data signals that may then be further processed in the mobile communication device.

The channel simulation unit serves to modify properties of the wireless communication channel, such properties may refer to different aspects of the wireless communication channel like attenuations, reflections, Doppler shifts, range delays, fading and noise. The channel simulation unit may modify any of the above mentioned aspects individually or in combination.

With the mobile communication device of the present patent application it is therefore possible to provide the mobile communication device with an increased self-testing capability.

It is for example possible to update the communication interface with a new waveform. "Waveform" in this regard refers to a set of parameters for the wireless communication via the wireless communication channel, like e.g. the used frequencies, the type of modulation scheme that should be used or any other relevant parameters. With the integrated channel simulation unit it is now possible to directly verify the behavior of such a waveform with the actual mobile communication device.

An operator of a mobile device communication system may with this arrangement e.g. perform automated over-the-air configurations of the mobile communication devices and monitor the mobile communication devices for example with the same waveforms under different geographic circumstances, e.g. in a city or in mountains. The mobile communication devices can e.g. also be provided with different waveforms in the same geographic area. The results of such tests may then e.g. be provided by the mobile communication device via the communication interface to a central test server.

Further embodiments of the present invention are subject of the further subclaims and of the following description, referring to the drawings.

In a possible embodiment, the communication interface may comprise an analog-to-digital converter coupled to a signal input of the mobile communication device and a first signal processor for processing digital signals provided by the analog-to-digital converter.

The signal input may e.g. comprise an antenna or antenna array of the mobile communication device. The analog-to-digital converter, ADC, may be coupled to the signal input and convert the analog signals received by the signal input into digital signals that may then be further processed by the first signal processor. The first signal processor may be any type of processing device, like e.g. an AISC, a DSP, a FPGA or the like. The first signal processor may also be integrated into another processing unit of the mobile communication device as firmware or software functions.

In a possible embodiment, the channel simulation unit may be arranged between the signal input and the analog-to-digital converter.

The channel simulation unit may be an individual or discrete unit that is provided in the mobile communication device in the analog part of the signal chain. It is understood that the channel simulation unit may comprise any necessary elements to process analog signals. Such elements may e.g. comprise any one of or a combination of input filters, ADCs, signal processors, DACs, and output filters.

With such a channel simulation unit it is possible to test at least part of the analog signal chain in the mobile communication device, especially the analog-to-digital converter of the communication interface in addition to the digital signal chain in the mobile communication device.

In a possible embodiment, the channel simulation unit may be arranged between the analog-to-digital converter and the first signal processor.

In contrast to the above embodiment a pure digital channel simulation unit may be provided between the analog-to-digital converter and the first signal processor. This allows simplifying the channel simulation unit. The channel simulation unit may e.g. be provided as pure firmware or software function in a firmware or software that is executed by the first signal processor. The channel simulation unit may receive the digital data from the analog-to-digital converter, perform respective processing for introducing the channel simulation modifications, and forward the modified digital data to the first signal processor, i.e. the signal processing functions in the first signal processor.

In a possible embodiment, the communication interface may comprise a digital-to-analog converter coupled to a signal output of the mobile communication device for converting digital signals provided by a second signal processor into analog signals.

The signal output may e.g. also comprise an antenna or antenna array of the mobile communication device. It is understood, that the signal output and the signal input may comprise the same antenna or antenna array. The digital-to-analog converter, DAC, may be coupled to the second signal processor and convert the digital signals provided by the second signal processor into analog waveforms for transmission via the signal output. The second signal processor may be any type of processing device, like e.g. an AISC, a DSP, a FPGA or the like. The second signal processor may also be integrated into another processing unit of the mobile communication device as firmware or software functions. It is further understood that the first and the second signal processors may be integrally formed as a single device, firmware or software.

In a possible embodiment, the channel simulation unit may be arranged between the digital-to-analog converter and the signal output.

As already explained above, the channel simulation unit may be an individual or discrete unit that is provided in the mobile communication device in the analog part of the signal chain. With such a channel simulation unit it is further possible to test at least part of the analog signal chain in the mobile communication device, especially the digital-to-analog converter of the communication interface, in addition to the digital signal chain in the mobile communication device.

In a possible embodiment, the channel simulation unit may be arranged between the digital-to-analog converter and the second signal processor.

In contrast to the above embodiment a pure digital channel simulation unit may be provided between the digital-to-analog converter and the second signal processor. This allows simplifying the channel simulation unit and providing the channel simulation unit e.g. as pure firmware or software function in a firmware or software that is executed by the second signal processor. The channel simulation unit may receive the digital data from the second signal processor, perform respective processing for introducing the channel simulation modifications, and forward the modified digital data to the digital-to-analog converter. The digital-to-analog converter will then forward respective analog data to the analog signal chain for wireless transmission, e.g. via an antenna or antenna array of the mobile communication device.

From the above it may be seen that the channel simulation unit may comprise a downstream section and an upstream section. The downstream section may refer to the channel simulation unit in conjunction with the analog-to-digital converter and the first signal processor. The upstream section may refer to the channel simulation unit in conjunction with the digital-to-analog converter and the second signal processor.

In an embodiment where the first signal processor and the second signal processor are a single signal processor, the channel simulation unit may also be a single channel simulation unit for the downstream and the upstream.

In a possible embodiment, the channel simulation unit may comprise software and/or firmware and/or hardware elements.

Above examples for possible channel simulation units have been given, where the channel simulation unit comprises either firmware or software or hardware. It is however understood, that any combination of software and hardware is possible.

The channel simulation unit, i.e. single elements of the channel simulation unit, may in the downlink therefore be arranged between the signal input and the analog-to-digital converter as well as between the analog-to-digital converter and the first signal processor. In the uplink the channel simulation unit, i.e. its elements, may be provided between the digital-to-analog converter and the signal output as well as between the digital-to-analog converter and the second signal processor.

In a possible embodiment, the mobile communication device may comprise a controllable bypass device for controllably bypassing the channel simulation unit.

Bypassing in this context refers to forwarding signals without active intervention of the channel simulation unit. The controllable bypass device may therefore e.g. be a hardware switching device that forwards signals around the channel simulation unit. The controllable bypass device may in addition or as an alternative also be a software or firmware switch. Such a software or firmware switch may cause certain channel simulation unit functions to be actively called in an active mode of the channel simulation unit. In an inactive mode of the channel simulation unit such software or firmware switches may cause the respective functions to be skipped.

In a possible embodiment, the channel simulation unit may comprise a signal processing unit for processing incoming signals for the communication interface and/or for processing outgoing signals from the communication interface.

The signal processing unit may e.g. be a discrete unit like a DSP, e.g. with corresponding filters, ADCs, DACs and the like. In addition or as an alternative the signal processing unit may also be a software or firmware in the first signal processor and/or second signal processor without dedicated analog circuitry for the signal processing unit.

In a possible embodiment, the channel simulation unit may comprise a memory for storing information about required or instructed modifications of the wireless communication channel.

The memory may be a discrete memory or comprise variables in a memory of the communication interface. The stored information may e.g. specify the details of the signal modifications like e.g. delay modifications, phase shift modifications, carrier or signal Doppler modifications, attenuation modifications and the like.

Such information may be pre-stored in the memory and may be retrieved when a specific test is started. In addition or as alternative such information may be provided wirelessly via the wireless communication channel.

In a possible embodiment, the signal processing unit may comprise a signal generator and/or a noise generator for overlaying wireless communication channel, i.e. the incoming and outgoing signals, with dedicated overlay signals and/or noise signals.

The ability to overlay the incoming and outgoing signals in the wireless communication channel with generated signals or noise increases the possible tests and modifications that may be performed with the wireless communication channel.

In a possible embodiment, the mobile communication device may comprise a mode switch for switching the mobile communication device into a test mode, wherein the channel simulation unit may only be active when the mobile communication device is in the test mode.

The mode switch may be a hardware or software switch that may be controlled e.g. by a firmware or software of the mobile communication device and that may activate or deactivate the channel simulation unit.

The mode switch may also be controlled remotely, e.g. with support of the firmware or software that may comprise a remote control interface, by an operator of the communication system in which the mobile communication device is used.

In a possible embodiment, the mobile communication device may comprise an evaluation unit for evaluating a quality of the communication via the communication interface with modified channel properties of the wireless communication channel that are modified by the channel simulation unit.

The evaluation unit allows automatically evaluating the results of a channel simulation in the mobile communication device. Evaluating the results in this context may refer e.g. to determining a signal-to-noise ratio, an error rate, a data rate, a voice quality or any other property of the wireless communication channel under the respective simulated channel conditions.

An operator of a communication system may e.g. perform tests of different waveforms that may be used in the communication system and determine the waveform with the best failure rate, the highest communication rates, the most stable voice communication or the like.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

Figure 1:
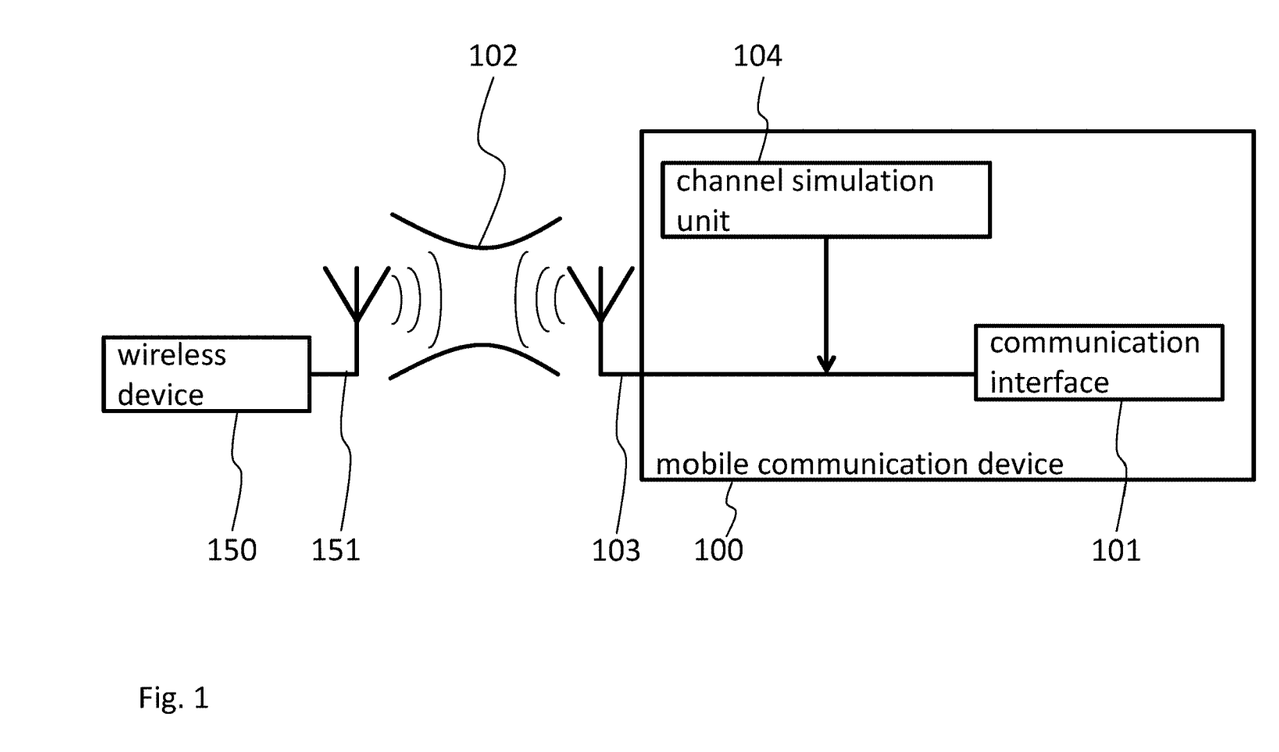
FIG. 1 shows a block diagram of an embodiment of a mobile communication device according to the present invention.

FIG. 1 shows a block diagram of a mobile communication device 100. The mobile communication device 100 may be any type of communication device that uses wireless communication to communicate with other devices. Such a mobile communication device 100 may e.g. be a mobile phone, an internet of things device, a wireless network device or any other type of wireless device.

The mobile communication device 100 comprises a communication interface 101 that is coupled to an antenna 103 for communicating the mobile communication device 100 via a wireless communication channel 102 with other wireless devices 150 (only one shown) that may also comprise an antenna 151.

The mobile communication device 100 further comprises a channel simulation unit 104 that may modify the properties of any signals that are received or transmitted by the communication interface 101 via the antenna 103.

The communication interface 101 may also be called the modem or modem component of the mobile communication device 100. Such a communication interface 101 may e.g. be provided as a combination of hardware and software. For example a communication protocol stack may be executed by a processor of the mobile communication device 100. The protocol stack may provide respective digital signals that may be converted into analog signals by hardware components of the communication interface 101 for transmission by the antenna 103. The same applies mutatis mutandis for signal reception.

The channel simulation unit 104 may modify properties of the wireless communication channel 102. The properties may e.g. refer to attenuations, reflections, Doppler shifts, range delays, fading and noise. This means that the channel simulation unit 104 may add any of the above attenuations, reflections, Doppler shifts, range delays, fading and noise alone or in combination to the signals received or transmitted via the antenna 103.

The channel simulation unit 104 may therefore comprise any analog and/or digital signal processing means necessary to perform such modifications.

In the following description of FIGS. 2-3 different arrangements of the channel simulation unit 104 will be exemplarily described.

Figure 2:
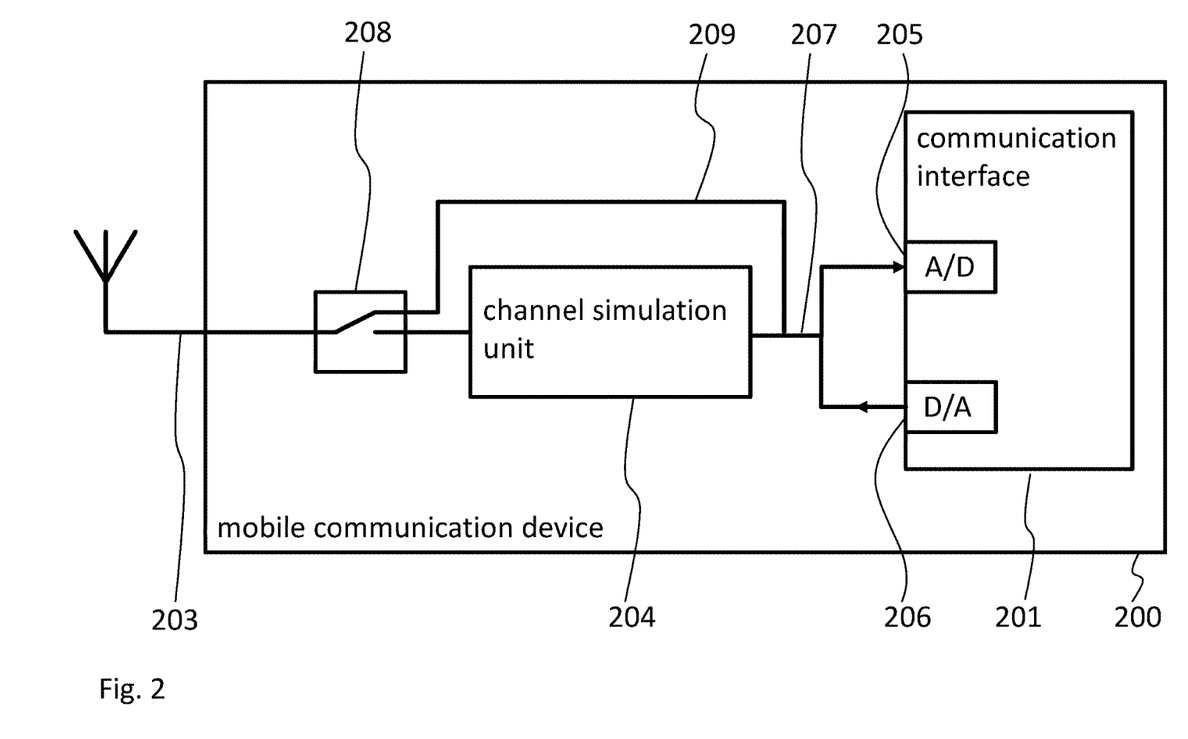
FIG. 2 shows a block diagram of another embodiment of a mobile communication device according to the present invention.

FIG. 2 shows a block diagram of another mobile communication device 200. The mobile communication device 200 comprises a communication interface 201. The communication interface 201 comprises an A/D converter 205 for converting incoming analog signals 207 into digital data signals. In addition, the communication interface 201 comprises a D/A converter 206 for converting outgoing digital signals into outgoing analog signals 207. The A/D converter 205 and the D/A converter 206 may both be provided integrally with the communication interface 201 e.g. as part of a communication controller or communication IC. As alternative the A/D converter 205 and the D/A converter 206 may also be provided as separate elements.

The A/D converter 205 and the D/A converter 206 are both connected to the channel simulation unit 204. In the mobile communication device 200 the channel simulation unit 204 therefore receives and provides analog signals 207 and modifies the analog signals 207.

The channel simulation unit 204 is connected to a bypass switch 208 that is connected to the antenna 203. The bypass switch 208 comprises a single antenna connection to antenna 203 and two switchable connections that may be coupled to the antenna 203 via the bypass switch 208. One of the switchable connections is connected to the channel simulation unit 204. The second switchable connection is connected to a bypass signal line 209 that bypasses the channel simulation unit 204 and is connected directly to the A/D converter 205 and the D/A converter 206.

In the mobile communication device 200 the bypass switch 208 and the channel simulation unit 204 are shown as separate units. It is understood, that the channel simulation unit 204 and the bypass switch 208 may also be provided as a single unit. The channel simulation unit 204 may e.g. comprise an enable input or a kind of configuration input that allows enabling or disabling and configuring the type of signal modifications performed by the channel simulation unit 204.

Figure 3:
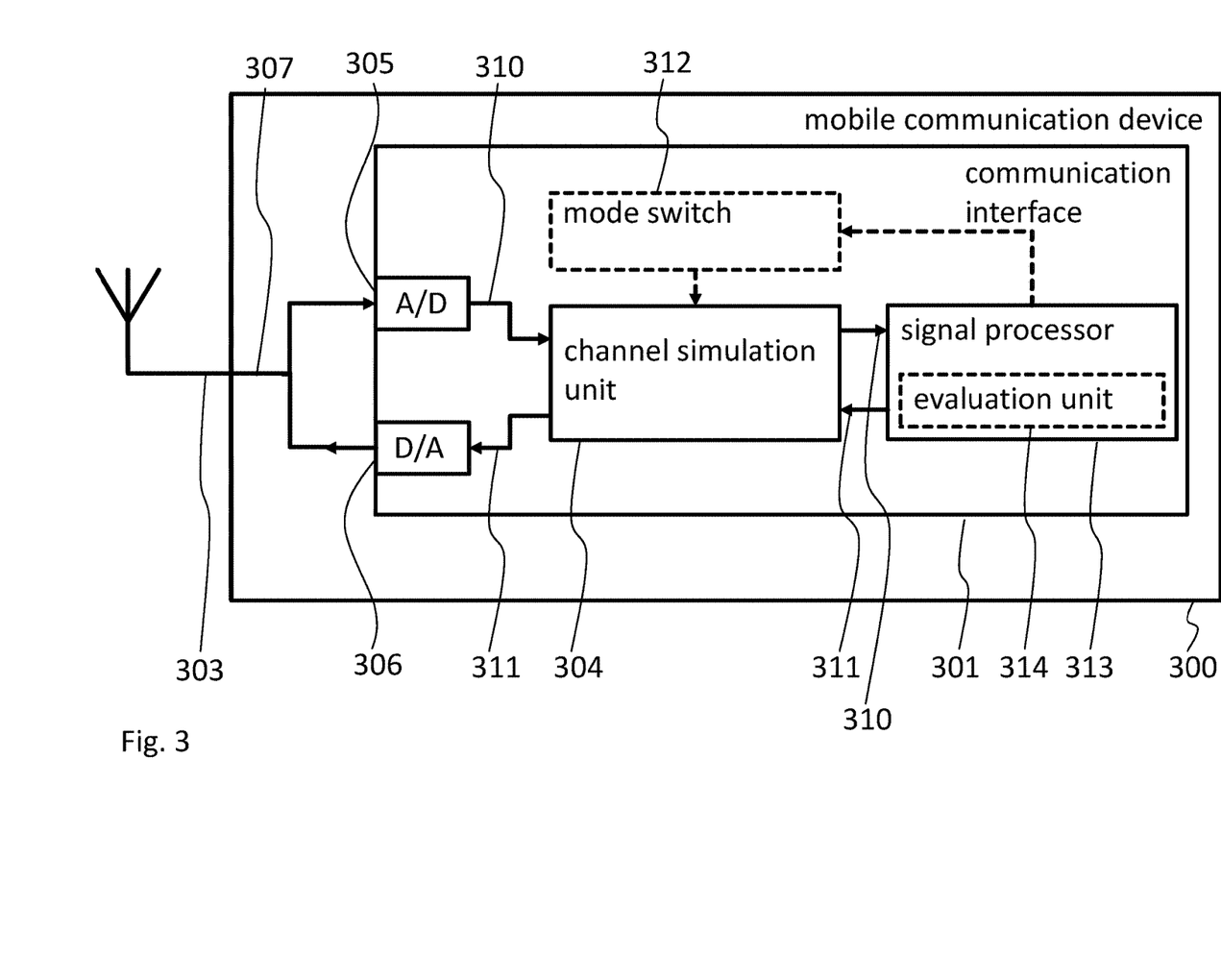
FIG. 3 shows a block diagram of another embodiment of a mobile communication device according to the present invention.

FIG. 3 shows a block diagram of another mobile communication device 300. The mobile communication device 300 comprises a communication interface 301 that is connected to the antenna 303. In contrast to the mobile communication device 200, the channel simulation unit 304 is not arranged between the antenna 303 and the communication interface 301. Instead, the channel simulation unit 304 is arranged within the communication interface 301 as functional unit of the communication interface 301 and is connected to a signal processor 313 of the communication interface 301 for providing incoming digital signals 310 to the signal processor 313 and for receiving outgoing digital signals 311 from the digital signal processor 313.

As in mobile communication device 200 the communication interface 301 provides analog signals 307 to the antenna 303. However, the channel simulation unit 304 does not process these analog signals 307. Instead, the channel simulation unit 304 being arranged in the communication interface 301 receives the digital incoming signals 310 from the A/D converter 305 and provides digital outgoing signals 311 to the D/A converter 306. This means that the channel simulation unit 304 does not need to perform analog signal processing any may therefore be implemented as a pure digital device or as a software or firmware function or module in the communication interface 301.

In the communication interface 301 the signal processor 313 and the channel simulation unit 304 are shown as separate units. It is understood, that the signal processor 313 and the channel simulation unit 304 may also be integrally formed as a single unit. This means that the signal processor 313 may e.g. comprise specific hardware units or software functions that perform the function of the channel simulation unit 304.

The communication interface 301 of the mobile communication device 300 further comprises two additional components that may be optionally provided. The first is a mode switch 312. The mode switch 312 serves for switching the mobile communication device 300, and especially the communication interface 301 and the channel simulation unit 304, from a normal operation mode to a test mode back and forth. The test mode may be an operation mode, in which the channel simulation unit 304 is active, while the channel simulation unit 304 may be deactivated or bypassed in the normal operation mode.

The second optional element is an evaluation unit 314. The evaluation unit 314 serves to evaluate the behavior of the mobile communication device 300 under the influence of the channel simulation unit 304. The evaluation unit 314 may e.g. evaluate the quality of the communication via the communication interface 301 with modified channel properties of the wireless communication channel that are modified by the channel simulation unit 314.

It is understood, that the above embodiments are only exemplary and that the single features of the mobile communication device 100, the mobile communication device 200, and the mobile communication device 300 may be freely combined. The mode switch 312 and/or the evaluation unit 314 may e.g. be used in the mobile communication device 100 or the mobile communication device 200.

Figure 4:
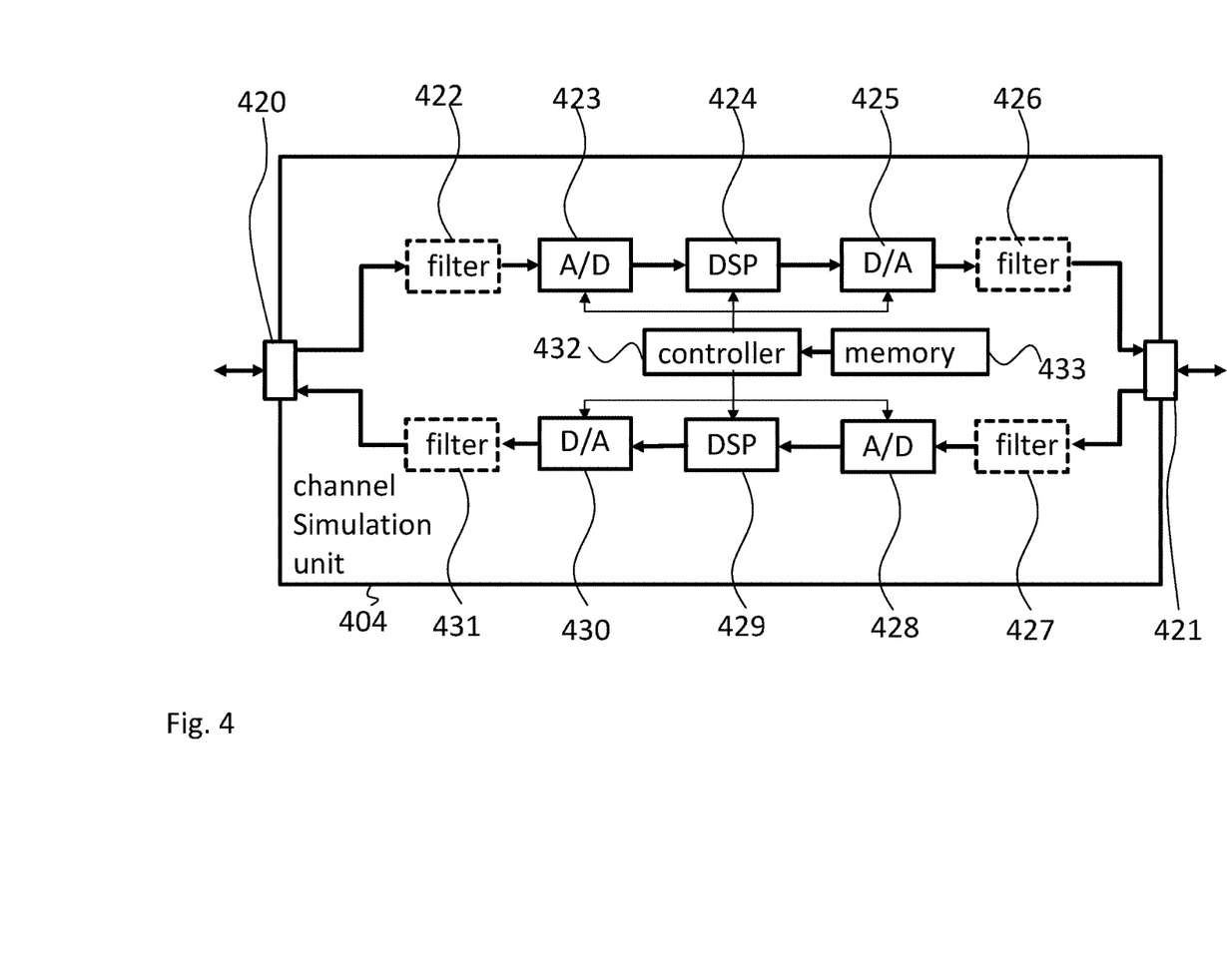
FIG. 4 shows a block diagram of an embodiment of a channel simulation unit according to the present invention.

FIG. 4 shows a block diagram of an embodiment of a channel simulation unit 404 as it may be used with the mobile communication device 100, the mobile communication device 200 and the mobile communication device 300. The channel simulation unit 404 is however provided for modifying analog signals. This will be apparent from the below detailed explanations.

The channel simulation unit 404 comprises an input port 420 and an output port 421. Although called input port 420 and output port 421 it is understood that the ports 420, 421 may be bidirectional ports. The input port 420 may e.g. be coupled to an antenna or a bypass switch. The output port 421 may be coupled to the communication interface.

The channel simulation unit 404 comprises a downlink signal path for signals received in the mobile communication device and an uplink signal path for signals transmitted from the mobile communication device.

The downlink signal path comprises a first optional filter 422 coupled to the input port 420. An analog-to-digital converter 423 is coupled to the filter 422 and a digital signal processor 424 is coupled to the analog-to-digital converter 423. In addition a digital-to-analog converter 425 is coupled to the digital signal processor 424 and a second optional filter is coupled between the digital-to-analog converter 425 and the output port 421.

In the uplink path a third optional filter 427 is coupled to the output port 421. An analog-to-digital converter 428 is coupled between the filter 427 and a digital signal processor 429. The digital signal processor 429 is coupled to the channel simulation unit 404 via a digital-to-analog converter 430 and a fourth optional filter 431.

Further, the channel simulation unit 404 comprises a controller 432 and a memory 433. It is understood that the controller 432, the digital signal processor 429 and the digital signal processor 424 may be provided as a single unit. Further, the memory 433 may also be provided as part of that unit. The memory 433 may e.g. store information about required modifications of the wireless communication channel that the digital signal processor 424 and the digital signal processor 429 should perform.

It is understood, that in other embodiments the channel simulation unit may comprise the above listed hardware units as computer program based functional units that may e.g. be executed by a controller of a communication interface.

For sake of clarity in the following description of the method based FIG. 5 the reference signs used above in the description of apparatus based FIGS. 1-4 will be maintained.

Figure 5:
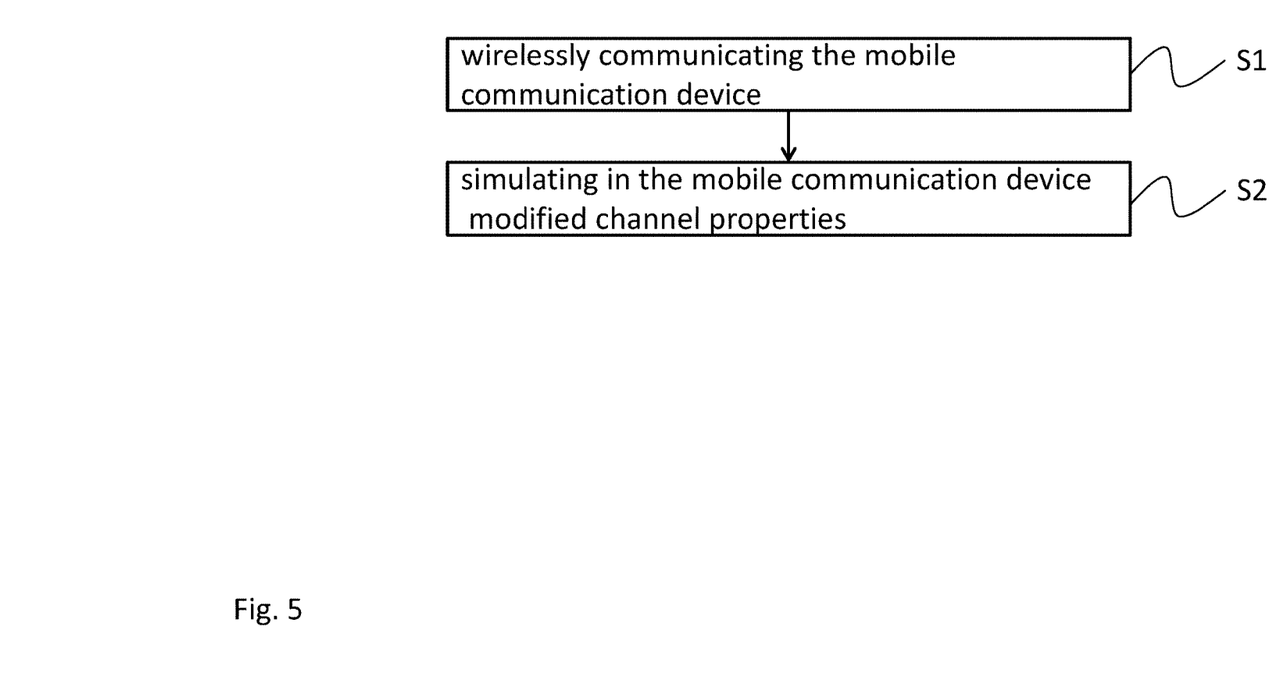
FIG. 5 shows a flow diagram of an embodiment of a method according to the present invention.

FIG. 5 shows a flow diagram of a method for operating a mobile communication device 100, 200, 300.

The method comprises wirelessly communicating S1 the mobile communication device 100, 200, 300 with wireless devices 150 over a wireless communication channel 102, and simulating S2 in the mobile communication device 100, 200, 300 modified channel properties of the wireless communication channel 102.

Wirelessly communicating S1 may comprise converting analog input signals received via a signal input of the wireless device into digital incoming signals 310 and processing the digital incoming signals 310 in the mobile communication device 100, 200, 300. Simulating S2 may then comprise modifying the analog input signals or modifying the digital input signals.

Wirelessly communicating S1 may further comprise converting digital outgoing signals 311 of the mobile communication device 100, 200, 300 into analog outgoing signals in the mobile communication device 100, 200, 300. Simulating S2 may then comprise modifying the analog outgoing signals or modifying the digital outgoing signals 311.

In addition simulating S2 may comprise modifying properties of the wireless communication channel 102 in software and/or firmware and/or hardware.

Simulating may e.g. be performed in a signal processing unit for processing incoming signals for the communication interface 101, 201, 301 and/or for processing outgoing signals from the communication interface 101, 201, 301.

In addition, simulating S1 may comprise storing information about required or instructed modifications of the wireless communication channel 102 and modifying the properties of the wireless communication channel 102 based on the stored information.

The method may further comprise controllably bypassing simulating S2 and only performing wirelessly communicating S1 the mobile communication device 100, 200, 300 in a standard operation mode of the mobile communication device 100, 200, 300. Further, the method may comprise performing simulating S1 and wirelessly communicating S2 the mobile communication device 100, 200, 300 in a test operation mode of the mobile communication device 100, 200, 300.

The method may further comprise overlaying the wireless communication channel 102 with dedicated overlay signals and/or noise signals, and evaluating a quality of the communication via the communication interface 101, 201, 301 with modified channel properties of the wireless communication channel 102.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100, 200, 300 mobile communication device
101, 201, 301 communication interface
102 wireless communication channel
103, 203, 303 antenna
104, 204, 304, 404 channel simulation unit
205, 305 analog-to-digital converter
206, 306 digital-to-analog converter
207, 307 analog signal
208 bypass switch
209 bypass signal line
310 digital incoming signal
311 digital outgoing signal
312 mode switch
313 signal processor
314 evaluation unit
420 input port
421 output port
422 filter
423 analog-to-digital converter
424 processor
425 digital-to-analog converter
426 filter
427 filter
428 analog-to-digital converter
429 processor
430 digital-to-analog converter
431 filter
432 controller
433 memory 150 wireless devices
151 antenna
S1, S2 method steps

The invention claimed is:

1. A mobile communication device comprising:
 a communication interface for wireless communication of the mobile communication device with wireless devices over a wireless communication channel,
 a channel simulation unit for simulating modified channel properties of the wireless communication channel,
 a mode switch for switching the mobile communication device into a test mode, wherein the channel simulation unit is only active when the mobile communication device is in the test mode, and
 a controllable bypass device for controllably bypassing the channel simulation unit in a standard operation mode of the mobile communication device.

2. The mobile communication device according to claim 1, wherein the communication interface comprises an analog-to-digital converter coupled to a signal input of the mobile communication device and a first signal processor for processing digital incoming signals provided by the analog-to-digital converter.

3. The mobile communication device according to claim 2, wherein the channel simulation unit is arranged between the signal input and the analog-to-digital converter.

4. The mobile communication device according to claim 2, wherein the channel simulation unit is arranged between the analog-to-digital converter and the first signal processor.

5. The mobile communication device according to claim 1, wherein the communication interface comprises a digital-to-analog converter coupled to a signal output of the mobile communication device for converting digital signals provided by a second signal processor into analog outgoing signals.

6. The mobile communication device according to claim 5, wherein the channel simulation unit is arranged between the digital-to-analog converter and the signal output.

7. The mobile communication device according to claim 5, wherein the channel simulation unit is arranged between the digital-to-analog converter and the second signal processor.

8. The mobile communication device according to claim 1, wherein the channel simulation unit comprises software and/or firmware and/or hardware elements.

9. The mobile communication device according to claim 1, wherein the channel simulation unit comprises a signal processing unit for processing incoming signals for the communication interface and/or for processing outgoing signals from the communication interface.

10. The mobile communication device according to claim 1, wherein the channel simulation unit comprises a memory for storing information about required or instructed modifications of the wireless communication channels.

11. The mobile communication device according to claim 1, wherein the signal processing unit comprises a signal generator and/or a noise generator for overlaying wireless communication channel with dedicated overlay signals and/or noise signals.

12. The mobile communication device according to claim 1, comprising an evaluation unit for evaluating a quality of the communication via the communication interface with modified channel properties of the wireless communication channel that are modified by the channel simulation unit.

13. A method for operating a mobile communication device with a communication interface for communication via a wireless communication channel, the method comprising:
 wirelessly communicating the mobile communication device with wireless devices over a wireless communication channel,
 simulating in the mobile communication device modified channel properties of the wireless communication channel in a test operation mode of the mobile communication device, and
 controllably bypassing simulating and only performing wirelessly communicating the mobile communication device in a standard operation mode of the mobile communication device.

14. The method according to claim 13, wherein wirelessly communicating comprises, in the mobile communication device, converting analog input signals received via a signal input of the wireless device into digital incoming signals and processing the digital incoming signals.

15. The method according to claim 14, wherein simulating comprises modifying the analog input signals.

16. The method according to claim 14, wherein simulating comprises modifying the digital input signals.

17. The method according to claim 13, wherein wirelessly communicating comprises, in the mobile communication device, converting digital outgoing signals of the mobile communication device into analog outgoing signals.

18. The method according to claim 17, wherein simulating comprises modifying the analog outgoing signals.

19. The method according to claim 17, wherein simulating comprises modifying the digital outgoing signals.

20. The method according to claim 13, wherein simulating comprises modifying properties of the wireless communication channel in software and/or firmware and/or hardware.

21. The method according to claim 13, wherein simulating is performed in a signal processing unit for processing incoming signals for the communication interface and/or for processing outgoing signals from the communication interface.

22. The method according to claim 13, wherein simulating comprises storing information about required or instructed modifications of the wireless communication channel and modifying the properties of the wireless communication channel based on the stored information.

23. The method according to claim 13, comprising overlaying the wireless communication channel with dedicated overlay signals and/or noise signals.

24. The method according to claim 13, comprising evaluating a quality of the communication via the communication interface with modified channel properties of the wireless communication channel.

* * * * *